United States Patent [19]

Jing et al.

[11] Patent Number: 5,654,375

[45] Date of Patent: Aug. 5, 1997

[54] FLUOROELASTOMER COMPOSITIONS CONTAINING ORGANO-ONIUM COMPOUNDS

[75] Inventors: Naiyong Jing, Woodbury; Robert E. Kolb, Afton; Trang D. Pham, Bloomington, all of Minn.

[73] Assignee: Minnesota Mining and Manufacturing Company, St. Paul, Minn.

[21] Appl. No.: 655,356

[22] Filed: May 24, 1996

[51] Int. Cl.$^6$ .................................................. C08F 8/42
[52] U.S. Cl. .................. 525/326.3; 525/340; 525/359.4; 525/360; 525/379
[58] Field of Search ................... 525/326.3, 340, 525/359.4, 360, 379

[56] References Cited

U.S. PATENT DOCUMENTS

| | | | |
|---|---|---|---|
| 3,876,654 | 4/1975 | Pattison | 260/30.4 |
| 4,117,236 | 9/1978 | Redmore | 560/129 |
| 4,233,421 | 11/1980 | Worm | 525/343 |
| 4,250,278 | 2/1981 | Suzuki et al. | 525/340 |
| 4,358,559 | 11/1982 | Holcomb et al. | 524/380 |
| 4,645,799 | 2/1987 | Wachi et al. | 525/340 |
| 4,828,923 | 5/1989 | Nakagawa et al. | 525/340 |
| 4,882,390 | 11/1989 | Grootaert et al. | 525/326.3 |
| 4,912,171 | 3/1990 | Grootaert et al. | 525/340 |
| 4,929,686 | 5/1990 | Sonoi et al. | 525/326.3 |
| 5,086,123 | 2/1992 | Guenthner et al. | 525/276 |
| 5,105,006 | 4/1992 | Parker | 562/30 |
| 5,216,085 | 6/1993 | Guenthner et al. | 525/351 |
| 5,262,490 | 11/1993 | Kolb et al. | 525/343 |
| 5,266,650 | 11/1993 | Guerra et al. | 525/326.4 |
| 5,384,374 | 1/1995 | Guerra et al. | 525/326.4 |

FOREIGN PATENT DOCUMENTS 0 211 431   2/1987   European Pat. Off. .

OTHER PUBLICATIONS

Grootaert et al., "Fluorocarbon Elastomers," *Kirk–Othmer Encyclopedia of Chemical Technology*, vol. 8, pp. 990–1005 (4th ed. 1993).

*Primary Examiner*—Bernard Lipman
*Attorney, Agent, or Firm*—Gary L. Griswold; Walter N. Kirn; John A. Burtis

[57] ABSTRACT

This invention provides a curable fluoroelastomer composition comprising:

(a) a fluorine-containing polymer or blend of fluorine-containing polymers each comprising interpolymerized units derived from one or more fluorine-containing ethylenically-unsaturated monomers;

(b) a crosslinking agent; and (c) an acid functional organo-onium compound.

15 Claims, No Drawings

FLUOROELASTOMER COMPOSITIONS CONTAINING ORGANO-ONIUM COMPOUNDS

FIELD TO THE INVENTION

This invention relates to fluorocarbon elastomers and their curing. In another aspect, the present invention relates to improved cure efficiency of curable fluoroelastomers.

BACKGROUND OF THE INVENTION

Fluorocarbon elastomers are synthetic elastomeric polymers with a high fluorine content—see, for example, W. M. Grootaert, G. H. Millet, & A. T. Worm. *Fluorocarbon Elastomers*, 8 Kirk-Othmer Encyclopedia Of Chemical Technology 990–1005 (4th ed. 1993). Fluorocarbon elastomers, particularly the copolymers of vinylidene fluoride with other ethylenically unsaturated halogenated monomers such as hexafluoropropene ($C_3F_6$) have become the polymers of choice for high temperature applications, such as seals, gaskets, and linings. These polymers exhibit favorable properties against the exposure to aggressive environments such as solvents, lubricants, and oxidizing or reducing agents. Additionally, these polymers can be compounded and cured to have high tensile strength, good tear resistance, and low compression set.

Presently used curing agents for fluoroelastomers include aromatic polyhydroxy crosslinking agents, such as polyphenols, used in combination with certain organo-onium vulcanization accelerators. U.S. Pat. No. 4,882,390 (Grootaert et al.), U.S. Pat. No. 4,912,171 (Grootaert et al.) and U.S. Pat. No. 5,086,123 (Guenthner et al.), for example, describe these compounds.

Certain classes of low glass transition temperature ($T_g$) fluoroelastomers are conventionally formed by curing fluoroelastomer compositions with certain functional fluoroaliphatic mono- and polyethers such as described in U.S. Pat. Nos. 5,266,650 and 5,384,374, both to Guerra et al. The polyethers described by these patents may be used in combination with one or more of the above-referenced crosslinking agents, or the polyethers taught by the references may be used themselves to crosslink the fluoroelastomer compositions.

In accordance with conventional curing processes, desired amounts of compounding ingredients and other conventional adjuvants or ingredients are added to the unvulcanized fluorocarbon elastomer stock and intimately admixed or compounded therewith by employing any of the usual rubber mixing devices such as Banbury mixers, roll mills, or any other convenient mixing device. The temperature of the ingredients during mixing typically will not rise above 120° C. During mixing, the components and adjuvants are distributed throughout the fluorocarbon gum. The curing process typically comprises either extrusion of the compounded mixture into a mold (injection molding) or pressing of the compounded mixture in a mold (press cure), e.g. a cavity or a transfer mold, followed subsequently by oven-curing (post cure). Injection molding of the compounded mixture is usually conducted in two temperature ranges. The compounded mixture is first introduced into an injection barrel whose orifice is typically operated at about 70° C. to 90° C. The mixture is then forced down the extruder barrel with the aid of a mechanical screw. The mold into which the mixture is extruded is typically operated at about 180° C. to 200° C. The resulting molded articles are also typically ultimately subjected to a post-cure at elevated temperatures for an extended period of time, e.g. at temperatures above 200° C. for 16 to 24 hours.

A drawback to the production of many of these conventional fluoroelastomers is their tendency towards "scorching," i.e., the premature or excessively rapid cure of the compounded composition when exposed to elevated temperatures or high shear conditions that produce a high temperature environment. This scorching behavior is particularly troublesome for injection-molded fluoroelastomers, wherein scorching is characterized by a premature cure initiation occurring prior to and during injection of the compounded composition into a mold. The point of cure initiation for injection-molded fluoroelastomers may be defined as the time after which the compounded fluoroelastomer is subjected to injection molding temperature conditions (i.e., upon introduction into an injection barrel at a temperature above approximately 70° C.) when the curing compound begins to gel or harden. Such a change in physical properties, particularly the corresponding viscosity increase, can greatly reduce processing efficiency by hindering the ability to inject the compounded mixture into a mold.

SUMMARY OF THE INVENTION

Briefly, in one aspect, this invention provides a curable fluoroelastomer composition comprising:

(a) a fluorine-containing polymer or blend of fluorine-containing polymers each comprising interpolymerized units derived from one or more fluorine-containing ethylenically-unsaturated monomers;

(b) a crosslinking agent; and (c) an acid functional organo-onium compound.

In another aspect, the present invention provides a method of improving the scorch safety and shelf-stability of curable fluoroelastomer compositions comprising the aforementioned composition.

The incorporation of an acid functional organo-onium compound into a curable fluoroelastomer composition in accordance with this invention provides improved scorch safety fluoroelastomer compositions by providing a delay in post-compounding cure initiation at operating temperatures while maintaining a rapid cure rate and without significantly affecting the resulting physical properties of the cured product. The organo-onium cure accelerators of the invention also exhibit stability when present in a compounded fluoroelastomer gum, particularly when one or more functional aliphatic mono- or polyether compounds or salts thereof are also present. Curable fluoroelastomer compositions containing these organo-onium compounds thereby exhibit superior shelf stability.

DETAILED DESCRIPTION OF THE INVENTION

Among the polymers which may be compounded in accordance with this invention are the elastomeric polymers whose interpolymerized units are derived from one or more of the following fluoromonomers: vinylidene fluoride, hexafluoropropene, chlorotrifluoroethylene, 2-chloropentafluoropropene, perfluoromethyl vinyl ether, tetrafluoroethylene, 1-hydropentafluoropropene, dichlorodifluoroethylene, trifluoroethylene, 1,1-chlorofluoroethylene, and mixtures thereof. Other terminally ethylenically-unsaturated fluoromonomers are also considered useful provided they contain at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical. These fluoromonomers may also be copolymerized with other compounds such as non-fluorinated alpha-olefin comonomers, e.g. ethylene or propylene. A preferred class of elastomers are copolymers of vinylidene fluoride and at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical. Particularly preferred are the elastomers produced by copolymerizing vinylidene fluoride with hexafluoropropene.

Fluoroelastomer copolymers according to the type described above are commercially available as incorporated cure copolymer gumstock that include the curable fluoroelastomer, a suitable crosslinking agent, and certain vulcanization accelerators together in one product. These commercial compositions are sold, for example, under the "Fluorel" trademark by the 3M Company, Saint Paul, Minn. Suitable products of the "Fluorel" line include Fluorel™ FC-2174 Fluoroelastomer (Fluorel™ Fluoroelastomers, product bulletin 98-0211-2133-4, issued July 1985, available from 3M Co., St. Paul, Minn.). Other commercially available products include fluoroelastomers sold under the "Fluorel II," "Viton," "Diael," and "Tecnoflon" trademarks.

A common crosslinking agent for a fluorocarbon elastomer gum is a polyhydroxy compound. The polyhydroxy compound used in its free or non-salt form and as the anionic portion of the onium salt complex can be any of those polyhydroxy compounds that function as a crosslinking agent or co-curative for fluoroelastomers, such as those polyhydroxy compounds disclosed in U.S. Pat. No. 3,876,654 (Pattison), and U.S. Pat. No. 4,233,421 (Worm). Representative aromatic polyhydroxy compounds include any one of the following: di-, tri-, and tetrahydroxybenzenes, naphthalenes, and anthracenes, and bisphenols of the following formula:

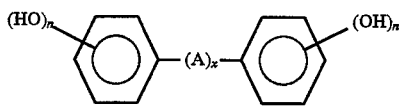

wherein A is a difunctional aliphatic, cycloaliphatic, or aromatic radical of 1 to 13 carbon atoms, or a thio, oxy, carbonyl, sulfonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, bromine, or with a carboxyl or an acyl radical (e.g. —COR, where R is H or a $C_1$ to $C_8$ alkyl, aryl, or cycloalkyl group) or alkyl radical with, for example, 1 to 8 carbon atoms. It will be understood from the above bisphenol formula that the —OH groups can be attached in any position (other than number one) in either ring. Blends of two or more of these compounds may also be used.

One of the most useful and commonly employed aromatic polyhydroxy compounds is 2,2-bis(4-hydroxyphenyl) hexafluoro-propane, known more commonly as bisphenol AF. The compounds 4,4'-dihydroxydiphenyl sulfone (Bisphenol S) and 2,2-bis(4-hydroxyphenyl)propane (bisphenol A) are also considered useful in the present invention. Other useful aromatic polyhydroxy compounds include hydroquinone and dihydroxybenzenes such as, resorcinol, 2-methyl resorcinol, 5-methyl resorcinol, 2-methyl hydroquinone, 2,5-dimethyl hydroquinone, and 2-t-butyl hydroquinone, 1,5-dihydroxynaphthalene and 9,10-dihydroxyanthracene. Still other suitable crosslinking compounds are known in the art and described, for example, in U.S. Pat. No. 4,912,171 (Grootaert et al.) and U.S. Pat. No. 5,262,490 (Kolb et al.) whose descriptions are incorporated herein by reference.

Another class of useful crosslinking agents that may be employed to cure a fluoroelastomer gum are those difunctional fluorinated ether compositions described by U.S. Pat. Nos. 5,266,650 and 5,384,374, both to Guerra et al., and both of whose descriptions are incorporated herein by reference. Such difunctional ether compositions include, for example, the following individual compounds:
$HOCH_2$—$CF_2OCF_2CF_2OCF_2$—$CH_2OH$,
$HOCH_2$—$CF_2O(CF_2CF_2OCF_2CF_2OCF_2O)_nCF_2$—$CH_2OH$,
$H_2NCH_2$—$CF_2O(CF_2CF_2O)_nCF_2$—$CH_2NH_2$, and
$HOCH_2$—$CF_2CF_2OCF_2CF_2$—$CH_2OH$.

The use of the above-described fluorinated ethers compositions provide a curable fluoroelastomer compositions that exhibit improved low-temperature flexibility and mold flow properties. These difunctional ether compositions may also be used in combination with other crosslinking agents or with monofunctional ether compositions to provide these improved properties.

One or more mono- or difunctional fluorinated ether salts may also be employed in the compositions of this invention. Such fluorinated ether salts may be easily incorporated into a fluoroelastomer gum, and when used in conjunction with the acid functional organo-oniums of the invention, these compounds impart improved low-temperature flexibility to the cured fluorocarbon elastomer composition. These compositions also provide an improved scorch resistant fluoroelastomer gum. When difunctional fluorinated ether salts are used, they may perform themselves as a crosslinking agent and may be used for such purpose or may be blended with one or more other crosslinking agents.

Useful functional fluoroaliphatic ether salts comprise a perfluoroether structure each end of which is bonded to a terminal group wherein at least one of such terminal groups is an alkoxide metal salt such as —$CH_2OMgOH$, —$CH_2OCaOH$, and —$CH_2OZnOH$, etc, or is an amino salt such as —$CH_2NH_3^+Cl^-$. Such salts include, for example, functional fluoroaliphatic mono- or polyether salts, e.g.:
$HOMgOCH_2$—$CF_2OCF_2CF_2OCF_2$—$CH_2OMgOH$,
$HOMgOCH_2$—$CF_2O(CF_2CF_2OCF_2CF_2OCF_2O)_nCF_2$—$CH_2OMgOH$
$HOMgOCH_2$—$CF_2O(CF_2CF_2OCF(CF_3)CF_2OCF_2O)_nCF_2$—$CH_2OMgOH$
$HOMgOCH_2$—$CF_2CF_2OCF_2CF_2$—$CH_2OMgOH$, and
$CF_3$—$O(CF_2CF_2O)_n$—$CF_2$—$CH_2OMgOH$
$Cl^-NH_3^+$—$CH_2$—$CF_2OCF_2CF_2OCF_2$—$CH_2$—$NH_3^+Cl^-$
$Cl^-NH_3^+$—$CH_2$—$CF_2CF_2OCF_2CF_2$—$CH_2OCaCl$
$HOMgOCH_2$—$CF_2OCF_2CF_2OCF_2$—$CH_2OCH_2CH$=$CH_2$ Difunctional fluorinated ether salts useful for the above-stated purpose include those that may be represented generally by Formula II below.

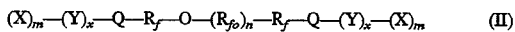

wherein:
each $R_f$ is, independently, a linear or branched perfluoroalkylene group of 1 to about 20 carbon atoms;
$R_{fo}$ comprises linear or branched perfluoroalkylene ether groups wherein said groups may be random, block, or any combination thereof; representative $R_{fo}$ groups include:
—$(CF_2)_2$—O—, —$CF_2O$—, —$(CF_2)_3$—O—,
—$(CF_2)_4$—O—, —$CF_2$—$CF_2$—O—$CF_2$—O—, —CF$_2$—CF$_2$—O—CF$_2$—CF$_2$—O—CF$_2$—O—,
—(CF$_2$—CF(CF$_3$)—O)$_n$—;

each Q is, independently, a divalent linking group that is preferably selected from the group consisting of: —O—, —C$_6$H$_3$(R')O—, —CH$_2$CR$_2$O—, —CR$_2$O—, Z—N$^+$H$_3$—C$_6$H$_3$(R')—, and Z—NH$_3^+$—CH$_2$— where R is a hydrogen atom or is a fluorinated or non-fluorinated alkyl group preferably having from 1 to about 2 carbon atoms and preferably fluorinated, R' is a hydrogen or halogen atom or is a substituted or unsubstituted, cyclic or acyclic alkyl or aryl group having 1 to 10 carbon atoms that may optionally contain one or more catenary heteroatoms, and where Z is a anion such as a halide; the oxygen atoms depicted in the formulas immediately above will be connected to the depicted Y groups where such Y groups are present;

each Y is, independently, a divalent metal atom, such as Mg, Zn, Ca, or Ni, or a monovalent metal atom, such a Na, Li, or K; a divalent metal is preferred, Mg being particularly preferred;

each X is, independently, a halogen atom, a hydroxyl group, or is of the formula —OR" or —OOCR" where R" is a short-chain alkyl group having from 1 to about 4 carbon atoms;

n is a number from 0 to 30;

x is 0 or 1 with the proviso that when Q is terminated by an amino group, such as where Q is Z—N$^+$H$_3$—C$_6$H$_3$(R')— or Z—N$^+$H$_3$—CH$_2$— as depicted supra, x is 0; and m is 0 or 1 with the proviso that when Y is a monovalent metal atom, such as Na, Li, or K, m is 0; when Y is a divalent metal atom, m is 1; and when x is 0, m is 0.

Monofunctional fluorinated ether salts useful in the practice of the invention to impart improved low-temperature flexibility to the cured fluorocarbon elastomer composition and to provide an improved scorch resistant fluoroelastomer gum include those that may be represented generally by Formula III below:

 (III)

wherein:

R$_f$, R$_{fo}$, Q, Y, X, x, m, and n are as defined supra for Formula II; and

R is a monovalent, fluorinated or non-fluorinated alkyl or aryl group containing from 1 to about 10 carbon atoms or is a fluorinated or non-fluorinated allyl group containing from 2 to 10 carbon atoms.

The acid functional organo-onium compounds of this invention are organo-onium compounds that are capable of functioning as a vulcanization accelerator. As is known in the art, an organo-onium is the conjugate acid of a Lewis base (e.g., phosphine, amine, ether, and sulfide) and can be formed by reacting said Lewis base with a suitable alkylating agent (e.g., an alkyl halide or acyl halide) resulting in an expansion of the valence of the electron donating atom of the Lewis base and in a positive charge on the organo-onium compound. Useful acid functional organo-onium compounds include those represented generally by formula IV below.

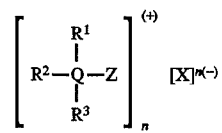

wherein:

Q is a nitrogen, phosphorus, arsenic, or antimony;

Z is a substituted or unsubstituted, cyclic or acyclic alkyl group having from 4 to about 20 carbon atoms that is terminated with a group of the formula —COOA where A is a hydrogen atom or is a metal cation or Z is a group of the formula CY$_2$—COOR' where Y is a hydrogen or halogen atom, or is a substituted or unsubstituted alkyl or aryl group having from 1 to about 6 carbon atoms that may optionally contain one or more catenary heteroatoms and where R' is a hydrogen atom, a metal cation, an alkyl group, or is an acyclic anhydride, e.g., a group of the formula —COR where R is an alkyl group or is a group that itself contains organo-onium (i.e., giving a bis organo-onium); preferably, R' is hydrogen; or Z may also be a substituted or unsubstituted, cyclic or acyclic alkyl group having from 4 to about 20 carbon atoms that is terminated with a group of the formula —COOA where A is a hydrogen atom or is a metal cation;

R$^1$, R$^2$, and R$^3$ are each independently an alkyl, aryl, alkenyl, or any combination thereof; each R$^1$, R$^2$, and R$^3$ can be substituted with chlorine, fluorine, bromine, cyano, —OR" or —COOR" where R" is a C$_1$ to C$_{20}$ alkyl, aryl, aralkyl, or alkenyl, and any pair of the R$^1$, R$^2$, and R$^3$ groups can be connected with each other and with Q to form a heterocyclic ring; one or more of the R$^1$, R$^2$, and R$^3$ groups may also be group of the formula Z where Z is as defined above;

X is an organic or inorganic anion (e.g., halide, sulfate, acetate, phosphate, phosphonate, hydroxide, alkoxide, phenoxide, or bisphenoxide); and n is a number equal to the valence of the anion X.

Fillers can be mixed with the fluoroelastomer gum to improve molding characteristics and other properties. When a filler is employed, it can be added to the vulcanization recipe in mounts of up to about 100 parts per hundred parts by weight of gum, preferably between about 15 to 50 parts per hundred parts by weight of the gum. Examples of fillers which may be used are reinforcing thermal grade carbon blacks or non-black pigments of relatively low reinforcement characteristics such as clays and barytes.

Fluoroaliphatic sulfonamides can also be added to the compositions of the invention, including those of the formula R$_f$SO$_2$NHR", where R" is an alkyl radical having, for example, from 1 to 20 carbon atoms, preferably from 1 to 12 carbon atoms, R$_f$ is a fluoroaliphatic radical such as a perfluoroalkyl, e.g., C$_n$F$_{2n+1}$ where n is 1 to 20, or perfluorocycloalkyl, e.g., C$_n$F$_{2n-1}$ where n is 3 to 20, such compounds being described, for example, in U.S. Pat. No. 5,086,123 (Guenther et al.). The fluoroaliphatic sulfonamide is preferably a perfluoroalkylsulfonamide and may be added as a separate compound, or as the anion of the organo-onium compound.

One or more monohydroxyfunctional phenols may also be admixed with the fluoroelastomer compositions of the invention. The monophenol compounds act to delay the cure of the fluoroelastomer compositions and thereby further improve the scorch safety of the compositions over those compositions formulated with their absence. Monohydroxyfunctional phenols useful for this purpose include those of the formula:

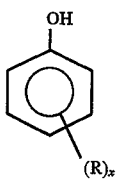

wherein:
R is a halogen atom or an acyl, aryl, polyaryl (fused to or separated from the aromatic ring) or alkyl radical substituent (or any combination thereof), the latter three of which may be straight-chained, branched, cyclic, or halogenated;
when R is a halogen atom, x may be between 1 and 5, otherwise, x may be between 1 and 3;
the —R group may optionally contain one or more catenary heteroatoms, i.e. a non-carbon atom such as nitrogen or oxygen; However, where x is 1 and where the single —R group is a carboxylic acid group and the resulting compound is classifiable as a benzoic acid, (e.g. where R is —COOH), the carboxylic acid substituent must be placed in either the meta or para position on the ring relative to the hydroxyl group.

It will be understood from the above Formula V that the constituent —R group can otherwise be attached in any position in the ring relative to the hydroxy functional group. Preferably, however, to avoid possible steric hindrance of the —OH functionality, said —R group is configured in either the meta or para position relative to the hydroxyl group where said —R group contains more than two carbon atoms. The constituent —R group may contain a phenol where the resulting compound, classifiable as a polyphenol, is monohydroxy functionally hindered by steric effects on one of the hydroxyl groups (i.e. there are one or more substituent groups that contain more than 2 carbon atoms in the meta or para position relative to that hindered hydroxyl group). Such a monohydroxyfunctionally hindered polyphenol will act for the purposes of the present invention as a monophenol, such as, for example, where —R is 2,6-di t-butyl 4-hexafluoropropyl phenol. Representative individual constituent —R groups according to the above-described formula V include the following: —CN, —NO$_2$, —COC$_6$H$_5$, —COCH$_2$C$_6$H$_5$, —COCH$_3$, —COOCH$_3$, —CF$_3$, —NHCH$_2$COOH, —COOH, —C$_6$H$_5$, —CH$_2$OH.

The cure accelerators and crosslinking agent can be added to the uncured polymer gum in the form of finely divided solids or as solutions in alcohol or ketone solvents by mixing the materials into the polymer gum stock. Thus mixed, the gum stock can generally be stored at room temperature for extended periods of time.

Prior to curing, an acid acceptor is mixed into the gum stock, after which storage life of the stock is more limited. Acid acceptors can be inorganic or blends of inorganic and organic. Examples of inorganic acceptors include magnesium oxide, lead oxide, calcium oxide, calcium hydroxide, dibasic lead phosphite, zinc oxide, barium carbonate, strontium hydroxide, calcium carbonate, etc. Organic acceptors include epoxies, sodium stearate, and magnesium oxalate. The preferred acid acceptors are magnesium oxide and calcium hydroxide. The acid acceptors can be used singly or in combination, and preferably are used in amounts ranging from about 2 to 25 parts per 100 parts by weight of the polymer. All of the components of the curing system may be admixed prior to their incorporation into the polymer gum without departing from the scope of the invention.

The relative amounts of the crosslinking agent and onium salt are present in the composition in such amounts as to provide the desired cure and/or mold release of the composition when mixed with acid acceptor. Representative proportions of components of the curing system are as follows:
Acid acceptor: 0.5 to 40 phr
Onium salt: 0.2 to 5 mmhr
Crosslinker: 0.3 to 10 mmhr
Monohydroxyfunctional phenol: 0.5 to 5 phr All amounts are given in parts per 100 parts polymer (abbreviated "phr") or in millimoles per hundred grams polymer (abbreviated "mmhr"). These proportions are general ranges. The particular amount for each particular cure time and temperature will be apparent to one of ordinary skill in the art.

In accordance with this invention, the desired amounts of compounding ingredients and other conventional adjuvants or ingredients are added to the unvulcanized fluorocarbon gum stock and intimately admixed or compounded therewith by employing any of the usual rubber mixing devices such as Banbury mixers, roll mills, or any other convenient mixing device. The temperature of the mixture on the mill typically will not rise above about 120° C. During milling the components and adjuvants are distributed uniformly throughout the gum. The curing process typically comprises extrusion of the compounded mixture or pressing the compounded mixture in a mold, e.g., a cavity or a transfer mold, and subsequent oven-curing. Pressing of the compounded mixture (press cure) is usually conducted at a temperature between about 95° C. and about 230° C., preferably between about 150° C. and about 205° C., for a period of from 1 minute to 15 hours, typically from 5 minutes to 30 minutes. A pressure of between about 700 kPa and about 20,600 kPa is usually imposed on the compounded mixture in the mold. The molds first may be coated with a release agent and prebaked. The molded vulcanizate is then usually post-cured (oven-cured) at a temperature usually between about 150° C. and about 315° C., typically at about 232° C., for a period of from about 2 hours to 50 hours or more depending on the cross-sectional thickness of the article. The compositions of this invention can be used to form seals, O-rings, gaskets, etc.

Objects and advantages of this invention are illustrated in the following nonlimiting examples.

EXAMPLES

TEST METHODS

In the following examples, indicated results were obtained using the following test methods:
Hardness was determined using ASTM D 2240-85 Method A with a Type A-2 Shore Durometer. Units are reported in points.
Cure Rheology Tests were run on uncured, compounded admixture using a Monsanto Moving Die Rheometer (MDR) Model 2000 in accordance with ASTM D 5289-93a at 177° C., no preheat, 12 minute elapsed time and a 0.5° arc. Minimum torque ($M_L$) and highest torque attained during specified period of time when no plateau or maximum torque is obtained ($M_H$) were reported. Also reported were t$_s$2 (time for torque to increase 2 units above $M_L$, t'50 (time for torque to reach $M_L$+0.5($M_H$−$M_L$), and t'90 (time for torque to reach $M_L$+0.9($M_H$−$M_L$).
Press-Cure samples. Unless otherwise noted, 150×150×1.8 mm sheets were prepared for physical property determination by pressing at about 6.9×10$^3$ kPa for 10 min. at 177° C.

Post cure samples were prepared by placing a press-cured sample in a circulating air oven. The oven was maintained at 232° C. and the samples treated for 16 hrs.

Tensile Strength at Break, Elongation at Break, and Modulus at 100% Elongation were determined using ASTM D 412-92ε on samples cut from 1.8 mm sheet with ASTM Die D. Units reported in Mega Pascals (M Pa).

10% Retraction (TR-10) ASTM D1329-88. Units reported in °C.

Molecular weight and functionality of fluorinated ether diols were determined by $^{19}$F. NMR end group analysis.

Compression set determined by ASTM 395-89 Method B with 0.139 in. (3.5 min.) O-rings compressed for 70 hrs at 200° C. Results are reported as %.

Mooney scorch determined by ASTM 1646-94 (MS+1 @121° C). Results are reported as Minimum Viscosity (Min V), time to 3 unit rise ($t_3$, in minutes), time to 10 unit rise ($t_{10}$), and time to 18 unit rise ($t_{18}$). Mooney viscosity values are determined by ASTM 1646-94 (ML 1+10 @121° C.).

The following acid substituted oniums are used as cure accelerators in the examples of fluoroelastomer compositions of the invention.

Acid substituted Onium A

Acetic acid substituted triphenyl phosphonium chloride was prepared by adding 26.2 g (0.11 moles) of triphenylphosphine and 11.3 g (0.12 moles) of chloroacetic acid in 450 mL of methanol to a suitable flask. The mixture was heated at 35°–40° C. for 24 hours. The solvent was then removed and the residue was extracted with ether to give a white solid. This solid was further crystallized four times from absolute ethanol-ether.

Acid substituted Onium B

Acetic acid substituted tributyl phosphonium chloride was prepared by adding 11.3 g of (0.12 mol) chloroacetic acid and 20.2 g (0.10 mol) of tributyl phosphine to 100 mL of methanol. The methanol solution was then heated to 35°–40° C. for 20 hours. The methanol was removed and the reaction product washed with hexane and ether to remove unreacted tributyl phosphine and chloroacetic acid Acid substituted Onium C Acetic acid substituted trisdodecyl phosphonium chloride was prepared by adding 5.7 g of (0.06 mol) chloroacetic acid and 27.0 g (0.05 mol) of trisdecyl phosphine to 20 mL of methanol. The methanol solution was then heated to 35°–40° C. for 36 hours. The methanol was removed and the reaction product was washed with hexane and ether respectively to yield a waxy solid.

Acid substituted Onium D

Butyric acid substituted triphenyl phosphonium chloride was prepared by adding 26.2 g of (0.1 mol) triphenyl phosphine and 12.2 g (0.10 mol) of 3-chlorobutyric acid to a suitable flask. The mixture was blanketed with nitrogen, heated to 145° C. and maintained for 5 hours. After cooling, the reaction product was washed with ether and hexane to give a white solid.

Also, the following fluorinated ether salt compositions are used in some of the examples. In preparing the fluorinated ether salt compositions, various dihydro alcohols or diols, prepared as described in U.S. Pat. No. 5,266,650, were converted to their salt by the methods described below. Compositions are listed in weight % unless otherwise indicated. The unit "phr" refers to parts per hundred weight of the rubber.

Salt A

A magnesium salt of a fluorinated ether diol was made in a 1000 mL three-necked flask was fitted with a mechanical stirrer, thermometer and a refluxing condenser. The flask was charged with 500 g (0.4 mol) of a fluorinated ether diol of structure:

HO—CH$_2$—CF$_2$—O—(CF$_2$CF$_2$O)$_n$CF$_2$—CH$_2$—OH with a molecular weight of 1250, and 259.2 g of a sodium methoxide solution of 25 wt % sodium methoxide (1.2 mole) in methanol. The reaction mixture was stirred and heated to slight reflux for 2–3 hours. In a second flask was prepared a solution of 162.4 g (0.8 mol) of MgCl$_2$6H$_2$O in 350 mL methanol. The fleshly prepared sodium dialkoxide salt in the three-necked flask was slowly poured into the second flask containing the MgCl$_2$ and methanol solution. The solution was slowly stirred for 5–6 hours at room temperature. The solution was then quenched with 1500 mL cold water and filtered to collect the solid. The collected solid was washed three times with 600 mL cold water and then dried in an oven at 60° C. overnight. A yield of 498 g was obtained.

Salt B

A calcium salt of a fluorinated ether diol was made in a manner similar to Salt A except CaCl$_2$ was used instead of MgCl$_2$.

Salt C

A magnesium salt of a fluorinated ether alcohol, of structure C$_4$F$_9$OCF$_2$CF$_2$OCF$_2$CH$_2$OH (MW=432), was produced by a procedure similar to that for Salt A.

Commercially available fluoroelastomer gums were compounded with the above prepared fluorinated ether salt compositions and various other ingredients and cured. The cure rheology and physical properties of the cured composition were then determined. The gums used were copolymers which, except as otherwise indicated, have the weight percents of interpolymerized units derived from the monomers shown below. Comparisons were also made using the fluorinated ether compositions before converting to a salt.

| Gum | CF$_2$=CH$_2$ | CF$_2$=CFCF$_3$ | CF$_2$=CF$_2$ | CH$_2$=CHCH$_3$ | Mooney Viscosity |
|---|---|---|---|---|---|
| A | 44.5 | 31.2 | 24.3 | — | 75.0 |
| B | 28.0 | — | 56.8 | 15.2 | 46.0 |
| C | 35.3 | 41.1 | 23.6 | — | 69.0 |
| D | 60.0 | 40.0 | — | — | 38.0 |

WEIGHT % MONOMERS

Example 1

In Example 1, a compounded fluorelastomer gum of the invention was prepared using 100 g of fluoroelastomer gum D and adding 2.1 g of Bisphenol AF (4,4'-HOC$_6$H$_4$C(CF$_3$)$_2$C$_6$H$_4$OH), 1.25 mmol Acid substituted Onium A, 30 parts Thermax N-990 carbon black, 3 parts Elastomag 170 MgO, and 6 parts Ca(OH)$_2$ using a two-roll mill and conventional techniques.

A quantity of the compounded gum was used for cure rheology testing and the remainder of the gum was press-cured for 10 minutes at 177° C., and then post-cured for 16 hours at 232° C. The results of rheology tests are shown in Table 2.

Example 2–4

In Examples 2–4, a compounded fluoroelastomer gum of the invention was prepared and evaluated in a manner similar to Example 1 except Acid substituted Onium B was used in Example 2, Acid substituted Onium C was used in Example 3, Acid substituted Onium D was used in Example 4, each instead of Acid substituted Onium A.

Comparative Example C1

In Comparative Example C1, a compounded mixture was prepared and evaluated in a manner similar to Example 4 except benzyl triphenyl phosphonium chloride (BTPPC) was used as the cure accelerator instead of Acid substituted Onium D.

TABLE 1

| Additives | Example | | | | |
|---|---|---|---|---|---|
| | 1 | 2 | 3 | 4 | C1 |
| ACID ONIUM | A | B | C | D | BTPPC |
| ONIUM CONC. (mmol) | 1.25 | 1.25 | 1.25 | 1.25 | 1.25 |
| Bisphenol AF (phr) | 2.1 | 2.1 | 2.1 | 2.1 | 2.1 |

The compounded gums represented by the formulations in Table 1 were evaluated for rheological properties which are listed in Table 2. The rheology values for Example 4 and Comparative Example C1 were run at 200° C. instead of 177° C.

TABLE 2

| Cure Rheology | Example | | | | |
|---|---|---|---|---|---|
| | 1 | 2 | 3 | 4 | C1 |
| $M_L$ | 1.07 | 1.10 | 1.21 | 0.85 | 1.0 |
| $M_H$ | 18.3 | 21.81 | 22.58 | 12.31 | 22.7 |
| $t_s2$ | 1.46 | 1.05 | 4.97 | 8.72 | 0.55 |
| t'50 | 1.91 | 1.51 | 6.34 | 11.09 | 0.70 |
| t'90 | 2.68 | 1.97 | 8.45 | 13.25 | 0.95 |

The results in Table 2 indicate a useful cure rheology is obtained using the compounded gums of the invention. Also, a cure latency is observed when comparing the examples containing the acid-substituted oniums as described in the invention to the comparative example containing an onium which is not acid-substituted (BTPPC).

Example 5

In Example 5, a compounded fluorelastomer gum of the invention was prepared using 100 g of fluoroelastomer gum A and adding 1 millimole (0.39 g) of Acid substituted Onium B, 30 g. Thermax N-990 carbon black, 3 g. Elastomag 170 MgO, and 6 g. $Ca(OH)_2$ using a two-roll mill and conventional techniques.

To this compounded mixture was added 17.4 g (phr) of Salt A, the magnesium salt product described above. Milling continued until a homogenous blend formed. The surface of the blended material was observed to be dry, i.e., There was no separating of any components or exudation of any type.

A quantity of the compounded gum was used for cure rheology testing and the remainder of the gum was press-cured for 10 minutes at 177° C., and then post-cured for 16 hours at 232° C. The results of rheology tests are shown in Table 4 and physical property data is shown in Table 5.

Examples 6–8

In Examples 6–8, compounded fluoroelastomer gums of the invention were prepared and evaluated as in Example 5 except the additive levels used were as listed in Table 3. The amide additive is $C_8F_{17}SO_2N(CH_3)H$, made as described in U.S. Pat. No. 5,086,123 (Guenthner, Kolb), and was additionally added during the milling step.

Comparative Examples C2–C5

In Comparative Examples C2–C5, compounded mixtures were prepared and evaluated in a manner similar to Examples 5–8 respectively, except Benzyl triphenyl phosphonium chloride was used instead of the acid-substituted onium. The additive levels of some of the additives are shown in Table 3. The onium cure accelerator concentration is listed in millimoles, the others are shown as parts per hundred parts rubber (phr).

TABLE 3

| Additives | Example | | | | | | | |
|---|---|---|---|---|---|---|---|---|
| | 5 | C2 | 6 | C3 | 7 | C4 | 8 | C5 |
| ONIUM type | B | BTPPC | B | BTPPC | B | BTPPC | B | BTPPC |
| ONIUM (mmol) | 1.0 | 1.0 | 1.0 | 1.0 | 1.5 | 1.5 | 1.5 | 1.5 |
| AMIDE (phr) | — | — | 1.0 | 1.0 | — | — | 1.0 | 1.0 |
| SALT (phr) | 17.4 | 17.4 | 17.4 | 17.4 | 17.4 | 17.4 | 17.4 | 17.4 |

The compounded gums represented by the formulations in Table 3 were evaluated for cure rheology to produce the results listed in Table 4.

TABLE 4

| Cure Rheology | Examples | | | | | | | |
|---|---|---|---|---|---|---|---|---|
| | 5 | C2 | 6 | C3 | 7 | C4 | 8 | C5 |
| $M_L$ | 2.62 | 2.93 | 2.12 | 2.39 | 2.51 | 3.45 | 2.05 | 2.75 |
| $M_H$ | 14.69 | 15.58 | 19.88 | 21.56 | 18.04 | 18.78 | 22.46 | 23.78 |
| $t_s2$ | 2.62 | 1.37 | 2.46 | 1.15 | 1.20 | 0.63 | 1.24 | 0.56 |
| t'50 | 4.6 | 2.71 | 3.87 | 1.87 | 2.23 | 1.21 | 1.94 | 0.82 |
| t'90 | 8.69 | 6.59 | 7.42 | 4.11 | 5.26 | 3.31 | 4.14 | 1.61 |
| Min V | 60.2 | 93.8 | 62.2 | 66.5 | 62.9 | 115 | 62 | 94.7 |
| $t_3$, min. | 25.2 | 1.0 | 31.0 | 8.9 | 12.1 | 1.2 | 16.2 | 4.0 |
| $t_{10}$, min. | 30.2 | 4.4 | 35.9 | 10.6 | 14.3 | 4.1 | 18.9 | 4.5 |
| $t_{18}$, min. | 32.3 | 5.7 | 37.8 | 11.4 | 15.4 | 4.8 | 19.9 | 4.9 |

The results in Table 4 indicate a useful cure rheology is obtained using the compounded gums of the invention. Also, a cure latency is observed when comparing the examples containing the Acid-substituted Onium to the comparative examples containing the BTPPC.

TABLE 5

| Post-Cured Materials | Example | | | | | | | |
|---|---|---|---|---|---|---|---|---|
| | 5 | C2 | 6 | C3 | 7 | C4 | 8 | C5 |
| TENSILE (M Pa) | 9.7 | 11.4 | 13.6 | 14.1 | 10.9 | 12.5 | 12.3 | 13.5 |
| ELONGATION (%) | 195 | 207 | 160 | 168 | 172 | 182 | 130 | 145 |
| MODULUS (M Pa) | 5.2 | 5.6 | 7.1 | 7.3 | 6.1 | 6.9 | 8.6 | 8.3 |
| SHORE A | 71.6 | 72 | 74 | 74 | 73 | 74 | 74.5 | 74 |
| COMP. SET (%) | 32 | 27.3 | 18.2 | 16.8 | 24.0 | 22.2 | 19.5 | 17.3 |
| TR-10 (°C.) | −21.4 | −20.6 | −22.1 | −21.7 | −21.2 | −21.5 | −21.6 | −21.4 |

The results in Table 5 indicate useful properties may be obtained using the materials of the invention.

Examples 9–11

In Examples 9, 10, and 11, compounded fluoroelastomer gums of the invention were prepared and evaluated in a manner similar to Example 5 except Gum D was used in Example 9, Gum B was used in Example 10, and Gum C was used in Example 11, each as a replacement for Gum A used in Example 1. The level of acid-based onium cure accelerator used in each was 1.0 millimoles (0.44 phr). The surface of the blended materials was observed to be dry, i.e., There was no separating of any components or exudation of any type. The cure rheology properties are shown in Table 6 and the physical properties tested on Post-Cure samples are shown in Table 7.

TABLE 6

| Cure Rheology | Example | | |
|---|---|---|---|
| | 9 | 10 | 11 |
| $M_L$ | 0.75 | 1.43 | 0.78 |
| $M_H$ | 14.16 | 13.63 | 12.87 |
| $t_s2$ | 2.18 | 10.1 | 2.33 |
| t'50 | 3.78 | 14.78 | 3.84 |
| t'90 | 7.62 | 21.43 | 7.78 |

The results in Table 6 indicate a useful cure rheology is obtained using the compounded gums of the invention

TABLE 7

| Post-Cured Materials | Example | | |
|---|---|---|---|
| | 9 | 10 | 11 |
| TENSILE (M Pa) | 9.5 | 10.2 | 11.2 |
| ELONGATION (%) | 174 | 200 | 194 |
| MODULUS (M Pa) | 5.6 | 4.5 | 5.8 |
| COMP. SET (%) | 29.4 | 31.3 | 36.2 |
| TR-10 (°C.) | −22.4 | −16.9 | −15.8 |

The results in Table 7 indicate useful properties may be obtained using the materials of the invention.

Examples 12–15

In Examples 12–15, compounded fluoroelastomer gums of the invention were prepared and evaluated in a manner similar to Examples 5–8 respectively except, the crosslinking agent used was the fluorinated ether diol used to prepare Salt A instead of Salt A as used in Examples 5–8. The cure rheology properties are shown in Table 9 and the physical properties tested on Post-Cure samples are shown in Table 10.

Comparative Examples C6–C9

In Comparative Examples C6–C9, compounded mixtures were made in a manner similar to Examples 12–15 respectively, except BTPPC was used instead of Acid-substituted Onium B. The additive level of some of the additives are shown in Table 8.

TABLE 8

| Additives | Example | | | | | | | |
|---|---|---|---|---|---|---|---|---|
| | 12 | C6 | 13 | C7 | 14 | C8 | 15 | C9 |
| ONIUM type | B | BTPPC | B | BTPPC | B | BTPPC | B | BTPPC |
| ONIUM (mmol) | 1.0 | 1.0 | 1.0 | 1.0 | 1.5 | 1.5 | 1.5 | 1.5 |
| AMIDE (phr) | — | — | 1.0 | 1.0 | — | — | 1.0 | 1.0 |
| DIOL (phr) | 17.0 | 17.0 | 17.0 | 17.0 | 17.0 | 17.0 | 17.0 | 17.0 |

The compounded gums represented by the formulations in Table 8 were evaluated for cure rheology to produce the results listed in Table 9. A longer milling time was required to allow the incorporation of the liquid fluorinated ether diol. Also, the surface of the blended material was observed to be slightly oily, particularly if the blended material was in contact with an impervious surface, such as a polyethylene bag. This indicated an incompatibility of some degree between the liquid diol and the other components of the blend.

TABLE 9

| Cure Rheology | Example | | | | | | | |
|---|---|---|---|---|---|---|---|---|
| | 12 | C6 | 13 | C7 | 14 | C8 | 15 | C9 |
| $M_L$ | 1.54 | 1.85 | 1.18 | 1.5 | 1.64 | 1.82 | 1.28 | 1.49 |
| $M_H$ | 16.02 | 15.85 | 18.86 | 19.96 | 18.02 | 18.57 | 20.94 | 21.35 |
| $t_s2$ | 1.51 | 0.98 | 1.53 | 0.81 | 0.87 | 0.57 | 0.87 | 0.5 |
| t'50 | 2.66 | 1.63 | 2.62 | 1.29 | 1.43 | 0.88 | 1.31 | 0.68 |

TABLE 9-continued

| Cure Rheology | Example | | | | | | | |
|---|---|---|---|---|---|---|---|---|
| | 12 | C6 | 13 | C7 | 14 | C8 | 15 | C9 |
| t'90 | 6.06 | 4.05 | 5.67 | 2.79 | 3.29 | 2.01 | 2.57 | 1.2 |
| Min V | 41.0 | 44.5 | 42.8 | 45.3 | 45.5 | 47.1 | 44.1 | 48.3 |
| $t_3$, min. | 18.7 | 6.5 | 8.25 | 10.7 | 11.4 | 3.6 | 7.3 | 6.0 |
| $t_{10}$, min. | 25.5 | 8.3 | 35.3 | 13.4 | 13.3 | 4.3 | 19.0 | 7.1 |
| $t_{18}$, min. | 28.5 | 9.2 | 40.2 | 14.8 | 14.5 | 4.7 | 23.0 | 8.3 |

The results in Table 9 indicate a useful cure rheology is obtained using the compounded gums of the invention. Also, a cure latency is observed when comparing the examples containing the Acid-substituted Onium to the comparative examples containing the BTPPC.

TABLE 10

| Post-Cured Material | Example | | | | | | | |
|---|---|---|---|---|---|---|---|---|
| | 12 | C6 | 13 | C7 | 14 | C8 | 15 | C9 |
| TENSILE (M Pa) | 9.5 | 11.4 | 12.2 | 12.6 | 10.0 | 11.8 | 12.3 | 11.8 |
| ELONGATION (%) | 178 | 229 | 147 | 168 | 160 | 199 | 135 | 146 |
| MODULUS (M Pa) | 5.3 | 5.0 | 7.1 | 6.3 | 6.2 | 5.9 | 8.4 | 7.1 |
| SHORE A | 72.5 | 73 | 74 | 74 | 74 | 74 | 75 | 75 |
| COMP. SET (%) | 19 | 21 | 17.3 | 16.7 | 19.2 | 17.9 | 17.4 | 17.4 |
| TR-10 (°C.) | −22.3 | −22.0 | −22.7 | −22.0 | −22.1 | −21.7 | −22.2 | −21.9 |

The results in Table 10 indicate useful properties may be obtained using the materials of the invention.

Example 16

In Example 16, a compounded fluoroelastomer gum of the invention was prepared and evaluated in a manner similar to Example 7 except Salt B was used instead of Salt A and the level of addition was 17.7 phr instead of 17.4 phr. The surface of the blended material was observed to be dry, i.e., There was no separating of any components or exudation of any type.

The compounded fluoroelastomer gum cured as evidenced by the MDR results of $M_L$=2.5, $M_H$=19.4, $t_s2$ =0.4, t'50=0.71 and t'90=3.11.

Example 17

In Example 17, a compounded fluoroelastomer gum of the invention was prepared and evaluated in a manner similar to Example 7 except Salt C [thought to be $(C_4F_9OCF_2CF_2OCF_2CH_2O)_2MG$] was used in instead of Salt A and the level of addition was 10.2 phr instead of 17.4 phr. Additionally, 1.47 g of Bisphenol AF (4,4'-$HOC_6H_4C$ $(CF_3)_2C_6H_4OH$) was added as a cross linking agent. The surface of the blended material was observed to be dry, i.e., There was no separating of any components or exudation of any type.

The compounded fluoroelastomer gum cured as evidenced by the MDR results of $M_L$=3.1, $M_H$=14.7, $t_s2$=1.1, t'50=1.6 and t'90=2.2. Physical property data after post cure include tensile of 13.0 M Pa, elongation of 200%, modulus of 5.8 M Pa, Shore hardness of 77 and TR-10 of −20.2° C.

Example 18

In Example 18, a compounded fluoroelastomer gum of the invention was prepared and evaluated in a manner similar to Example 7 the Acid-substituted Onium was $(Bu)_3P^+C(CH_3)$ $HCOOHCl^-$ instead of Acid-substituted Onium B and the level of addition was 10.2 phr instead of 17.4 phr. The "Bu" in this formulation represents a butyl group. The surface of the blended material was observed to be dry, i.e., There was no separating of any components or exudation of any type.

The compounded fluoroelastomer gum cured as evidenced by the MDR results of $M_L$=2.52, $M_H$=17.67, $t_s2$= 1.27, t'50=2.41 and t'90=5.33 and Mooney scorch of Min V=63.4, $_3$=19.4, $t_{10}$=27.8, $t_{18}$=30.8. Physical property data after post cure include tensile of 12.6 M Pa, elongation of 170%, modulus of 7.6 M Pa, and Shore hardness of 76.

We claim:

1. A curable fluoroelastomer composition comprising:

(a) a fluorine-containing polymer or blend of fluorine-containing polymers each comprising interpolymerized units derived from one or more fluorine-containing ethylenically-unsaturated monomers;

(b) a crosslinking agent; and (c) an acid functional organo-onium compound.

2. The composition of claim 1 wherein said acid functional organo-onium compound is of the formula:

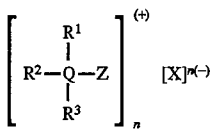

wherein:

Q is a nitrogen, phosphorus, arsenic, or antimony;

Z is a substituted or unsubstituted, cyclic or acyclic alkyl group having from 4 to about 20 carbon atoms that is terminated with a group of the formula —COOA where A is a hydrogen atom or is a metal cation or Z is a group of the formula $CY_2$—COOR' where Y is a hydrogen or halogen atom, or is a substituted or unsubstituted alkyl or aryl group having from 1 to about 6 carbon atoms that may contain one or more catenary heteroatoms and where R' is a hydrogen atom, a metal cation, an alkyl group, or is a group of the formula —COR where R is an alkyl group or is a group that itself contains organo-onium; or Z may also be a substituted or unsubstituted, cyclic or acyclic alkyl group having from 4 to about 20 carbon atoms that is terminated with a group of the formula —COOA where A is a hydrogen atom or is a metal cation;

$R^1$, $R^2$, and $R^3$ are each independently an alkyl, aryl, alkenyl, or any combination thereof; each $R^1$, $R^2$, and $R^3$ can be substituted with chlorine, fluorine, bromine, cyano, —OR" or —COOR" where R" is a $C_1$ to $C_{20}$ alkyl, aryl, aralkyl, or alkenyl, and any pair of the $R^1$, $R^2$, and $R^3$ groups can be connected with each other and with Q to form a heterocyclic ring; one or more of the $R^1$, $R^2$, and $R^3$ groups may also be group of the formula Z where Z is as previously defined;

X is an organic or inorganic anion; and n is a number equal to the valence of the anion X.

3. The composition of claim 1 wherein said crosslinking agent is a polyhydroxy compound.

4. The composition of claim 1 wherein said crosslinking agent is a polyhydroxy compound of the formula:

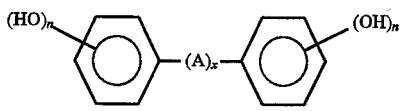

wherein:

A is a difunctional aliphatic, cycloaliphatic, or aromatic radical of 1 to 13 carbon atoms, or a thio, oxy, carbonyl, sulfonyl, or sulfonyl radical, A is optionally substituted with at least one chlorine or fluorine atom;

any aromatic ring of the polyhydroxy compound is optionally substituted with at least one atom of chlorine, fluorine, bromine, or with a carboxyl or an acyl radical or alkyl radical with 1 to 8 carbon atoms;

x is 0 or 1; and n is 1 or 2.

5. The composition of claim 1 wherein said crosslinking agent is a difunctional fluoroaliphatic mono- or polyether diol or its corresponding salt.

6. The composition of claim 1 wherein said acid-functional organo-onium compound is present in the composition at a concentration from 0.2 to 5 millimoles per hundred grams of fluoroelastomer gum.

7. The composition of claim 1 wherein said fluorine-containing polymer comprises a polymer whose interpolymerized units comprise units derived from two or more of the following monomers, $CF_2=CH_2$, $CF_2=CFCF_3$, $CF_2=CF_2$, $CH_2=CHCH_3$, $CF_2=CFOCF_3$.

8. The composition of claim 1 wherein said fluorine-containing polymer comprises a copolymer of vinylidene fluoride, hexafluoropropene, and, optionally, tetrafluoroethylene.

9. The composition of claim 1 wherein said fluorine-containing polymer comprises a copolymer of vinylidene fluoride, tetrafluoroethylene, and propylene.

10. The composition of claim 1 further comprising a functional fluoroaliphatic mono- or polyether salt.

11. A method of preparing an elastomer composition, comprising mixing:

(a) a fluorine-containing polymer or blend of fluorine-containing polymers each comprising interpolymerized units derived from one or more fluorine-containing ethylenically-unsaturated monomers;

(b) a crosslinking agent; and (c) an acid functional organo-onium compound.

12. The method of claim 11 wherein said acid functional organo-onium compound is of the formula:

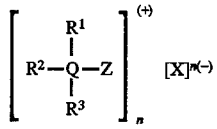

wherein:

Q is a nitrogen, phosphorus, arsenic, or antimony;

Z is a substituted or unsubstituted, cyclic or acyclic alkyl group having from 4 to about 20 carbon atoms that is terminated with a group of the formula —COOA where A is a hydrogen atom or is a metal cation or Z is a group of the formula $CY_2$—COOR' where Y is a hydrogen or halogen atom, or is a substituted or unsubstituted alkyl or aryl group having from 1 to about 6 carbon atoms that may contain one or more catenary heteroatoms and where R' is a hydrogen atom, a metal cation, an alkyl group, or is a group of the formula —COR where R is an alkyl group or is a group that itself contains organo-onium; or Z may also be a substituted or unsubstituted, cyclic or acyclic alkyl group having from 4 to about 20 carbon atoms that is terminated with a group of the formula —COOA where A is a hydrogen atom or is a metal cation;

$R^1$, $R^2$, and $R^3$ are each independently an alkyl, aryl, alkenyl, or any combination thereof; each $R^1$, $R^2$, and $R^3$ can be substituted with chlorine, fluorine, bromine, cyano, —OR" or —COOR" where R" is a $C_1$ to $C_{20}$ alkyl, aryl, aralkyl, or alkenyl, and any pair of the $R^1$, $R^2$, and $R^3$ groups can be connected with each other and with Q to form a heterocyclic ring; one or more of the $R^1$, $R^2$, and $R^3$ groups may also be group of the formula Z where Z is as previously above;

X is an organic or inorganic anion; and n is a number equal to the valence of the anion X.

13. A method of forming a cured elastomeric article, comprising 1) shaping a compounded elastomer composition, comprising: (a) a fluorine-containing polymer or blend of fluorine-containing polymers each comprising interpolymerized units derived from one or more fluorine-containing ethylenically-unsaturated monomers; (b) a crosslinking agent; and (c) an acid functional organo-onium compound, at an elevated temperature into the form of an article, and 2) heating said formed article to cure said compounded composition.

14. The method of claim 13 wherein said acid functional organo-onium compound is of the formula:

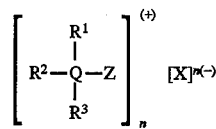

wherein:

Q is a nitrogen, phosphorus, arsenic, or antimony;

Z is a substituted or unsubstituted, cyclic or acyclic alkyl group having from 4 to about 20 carbon atoms that is terminated with a group of the formula —COOA where A is a hydrogen atom or is a metal cation or Z is a group of the formula $CY_2$—COOR' where Y is a hydrogen or halogen atom, or is a substituted or unsubstituted alkyl or aryl group having from 1 to about 6 carbon atoms that may contain one or more catenary heteroatoms and where R' is a hydrogen atom, a metal cation, an alkyl group, or is a group of the formula —COR where R is an alkyl group or is a group that itself contains organo-onium; or Z may also be a substituted or unsubstituted, cyclic or acyclic alkyl group having from 4 to about 20 carbon atoms that is terminated with a group of the formula —COOA where A is a hydrogen atom or is a metal cation;

$R^1$, $R^2$, and $R^3$ are each independently an alkyl, aryl, alkenyl, or any combination thereof; each $R^1$, $R^2$, and $R^3$ can be substituted with chlorine, fluorine, bromine, cyano, —OR" or —COOR" where R" is a $C_1$ to $C_{20}$ alkyl, aryl, aralkyl, or alkenyl, and any pair of the $R^1$, $R^2$, and $R^3$ groups can be connected with each other and with Q to form a heterocyclic ring; one or more of the $R^1$, $R^2$, and $R^3$ groups may also be group of the formula Z where Z is as previously above;

X is an organic or inorganic anion; and n is a number equal to the valence of the anion X.

15. A shaped article comprising the composition of claim 1 in its cured state.

* * * * *